United States Patent [19]
Gordon et al.

[11] Patent Number: 5,256,365
[45] Date of Patent: Oct. 26, 1993

[54] IN-MOLDING LABELING METHOD

[75] Inventors: Jeffrey D. Gordon, Hanover, Pa.; Jean F. Rubie, Waterloo, Belgium

[73] Assignee: Graham Engineering Corp., York, Pa.

[21] Appl. No.: 789,046

[22] Filed: Nov. 7, 1991

Related U.S. Application Data

[62] Division of Ser. No. 639,543, Jan. 10, 1991, Pat. No. 5,104,306.

[51] Int. Cl.$^5$ ............................................. B29C 49/24
[52] U.S. Cl. .................................. 264/509; 425/503; 271/9; 271/112
[58] Field of Search ................ 264/509; 425/503, 504, 425/126.1, 522; 271/5, 9, 112; 156/DIG. 28, 31, 245, 285, 571

[56] References Cited

U.S. PATENT DOCUMENTS

| | | | |
|---|---|---|---|
| 2,294,273 | 8/1942 | Buxbaum | 271/5 |
| 3,779,829 | 12/1973 | Wolff | 156/361 |
| 4,479,644 | 10/1984 | Bartimes et al. | 264/509 |
| 4,540,460 | 10/1985 | Blomquist et al. | 425/126.1 |
| 4,636,166 | 1/1987 | Franks et al. | 425/503 |
| 4,637,600 | 1/1987 | Bartimes et al. | 271/93 |
| 4,680,000 | 7/1987 | Nowicki et al. | 425/126 |
| 4,737,099 | 4/1988 | Kaminski | 425/504 |
| 4,815,955 | 3/1989 | Krall | 425/116 |
| 4,834,643 | 5/1989 | Klinedinst et al. | 425/537 |
| 4,840,366 | 6/1989 | Johnston et al. | 271/9 |
| 4,917,592 | 4/1990 | Plenzler et al. | 425/503 |
| 4,944,665 | 7/1990 | Hasl et al. | 425/116 |
| 4,973,241 | 11/1990 | Keyser | 425/503 |
| 5,039,298 | 8/1991 | Takakusaki et al. | 264/509 |
| 5,044,922 | 9/1991 | Plenzler et al. | 425/503 |

FOREIGN PATENT DOCUMENTS

724989 2/1955 United Kingdom .

Primary Examiner—Catherine Timm
Attorney, Agent, or Firm—Thomas Hooker

[57] ABSTRACT

A method of labeling mold cavities in a blow-molding machine using an in-mold labeling system including first and second label magazines, first and second rotary members each having a label transfer unit with a suction cup, and using the steps of rotating each member to position the suction cup adjacent a magazine, transferring a label in the magazine to the cup, rotating the member to position the held label adjacent a pickup position, transferring the label to a suction cup of an in-mold labeling unit and actuating the unit to place the labels in mold cavities of a blow molding machine. When the suction cup of the transfer unit is adjacent the magazine, a high vacuum is drawn to remove one label from the magazine and then the vacuum level is reduced to a low vacuum. During transfer of the label from this suction cup to the suction cup of the labeling unit, the low vacuum is maintained on the transfer unit suction cup while a high vacuum connection is formed between the labeling unit cup and the label. The higher vacuum allows the label to be stripped from the transfer unit suction cup and transferred to the labeling unit suction cup.

6 Claims, 7 Drawing Sheets

IN-MOLDING LABELING METHOD

This is a division of application Ser. No. 639,543, filed Jan. 10, 1991 now U.S. Pat. No. 5,104,306.

FIELD OF THE INVENTION

The invention relates to apparatus and methods for feeding labels from label magazines to mold sections in the manufacture of labeled blow molded bottles.

DESCRIPTION OF THE PRIOR ART

Conventionally labels are supplied to mold sections of blow molding machines by an in-mold labeling apparatus having transfer heads that engage and move the labels. The transfer heads are connected to a drive mechanism that cycle the heads back and forth between a label pick up position and a label transfer position. The heads carry vacuum cups for engaging and holding labels. When in the label pick up positions, the heads are moved against labels held in label magazines to form vacuum connections with the labels. Movement of the heads away from the magazines pulls labels from the magazines. The labels are carried with the heads for subsequent placement in cavities in the mold sections.

Current rotary blow molding machines are capable of operating at high production rates. In order to operate these machines at maximum speed the in-mold labeling apparatus must necessarily operate rapidly with great reliability and a short cycle time.

During the cycle of a conventional in-mold labeling apparatus it is necessary to move the vacuum cups on the transfer heads into engagement with the lead label in the magazine and form a strong vacuum connection with the label sufficient to assure that the label is held in place on the head as the head is withdrawn from the magazine and the label is stripped out past the gripping fingers in the magazine. The head is dwelled for a relatively long interval with the cup on the label in order to assure that the pressure within the cup is reduced sufficiently to form the desired strong vacuum connection with the label. The dwell interval is required in order that the air captured within the cup upon physical engagement with the label can be withdrawn from the cup through the vacuum manifold to the vacuum source thereby reducing the pressure in the cup and forming the desired strong connection.

It is conventional to minimize the dwell interval during which the connection is formed by reducing the vacuum of the vacuum source and by locating the vacuum source close to the suction cup. However, the labels cannot be reliably removed from the magazines if the interval is made too small or the vacuum is too weak.

Single labels cannot be withdrawn using a very strong vacuum. This is because if the vacuum is too high air is drawn through the thickness of the lead label and the cup holds two or more labels in place and will withdraw all the held labels when moved from the label magazine. Withdrawal of more than one label at a time produces at least a reject bottle and can result in shut down of an entire blow molding line.

The baskets used to supply labels for pick up by in-mold label apparatus extend away from label pick up positions. As labels are exhausted from the fronts of the baskets operators must refill the baskets in order to assure continued in mold labelinq. The baskets are located close to other the parts of the in-mold labeling apparatus and the blow molding machine. This close proximity makes loading of the baskets difficult.

The label baskets mounted on the frame of the in-mold labeling system using a connection which permits limited rotation of the baskets to adjust the rotary positions of the labels as presented to the pick up heads. This rotational adjustment of the baskets permits limited adjustment of the angular position of the labels when picked up from the basket and when placed in the mold sections. In some blow molding operations, labels are placed in mold cavities which are angularly oriented relative to the label transfer heads. The limited rotational adjustability of the magazines is not sufficient to permit labels to be rotated through a relatively large angle for proper placement in these oriented mold cavities. Mounting of the magazines at a rotational position sufficient to assure proper orientation for placement of the labels in the angularly oriented mold sections can make it difficult to refill the baskets with labels in order to assure continuous operation of the blow molding line.

SUMMARY OF THE INVENTION

The invention is an improved in-mold labeling system including an in-mold labeling apparatus for moving labels to a rotary blow molding machine and placing the labels in the cavities of mold sections and rotary label transfer apparatus for withdrawing labels from label magazines and presenting the labels for pick up by the transfer heads of the in-mold labeling apparatus. The in-mold labeling apparatus includes pairs of label transfer heads on each side of the apparatus. Separate rotary label transfer apparatus are provided on each side of the in-mold labeling apparatus to present labels to the adjacent IML label transfer heads. Each rotary transfer apparatus includes a pair of rotary transfer wheels and a pair of label magazines, one magazine for each wheel. The wheels carry transfer units which are moved to positions opposite the magazines, are extended to engage labels in the magazines, are withdrawn and are moved to pick up positions where the labels are transferred to the transfer heads of in-mold labeling apparatus. During movement to the pick up positions the labels may be rotated to assure proper angular orientation when picked up by the in-mold labeling apparatus for placement in the mold sections.

The rotary transfer wheels operate to pick up labels from the magazines and move the labels for pick up by the in-mold labeling apparatus during the relatively long time interval while the in-mold labeling apparatus transfer heads move the labels to the mold sections, place the labels in the mold cavities and return to pick up the next labels. This long cycle period provides sufficient time to form reliable vacuum connections between the vacuum cups on the transfer wheels heads and the lead label in the label magazine. A sufficiently high vacuum is used to assure a connection which withdraws one label at a time from the magazine. The vacuum in the suction cups holding the labels on the transfer wheels is reduced before the labels are moved for pick up by the in-mold labeling apparatus in order to facilitate ready transfer of the labels held by the suction cups of the wheel to the suction cups of the in-mold labeling apparatus transfer heads.

Reliable label pick up from the magazines is facilitated by movement of the label transfer heads in the units directly toward the magazines so that the suction cups do not move laterally with respect to the magazines during engagement with the lead labels and during withdrawal of the captured individual labels from the magazines.

Rotary label transfer apparatus includes a pair of rotary wheels that pick labels from magazines and move the labels to positions for pick up by the IML transfer heads. Location of the label magazines in free available space within the in-mold labeling system is facilitated by use of a first large diameter rotary wheel having three 120 degree-spaced label transfer units and a second, relatively smaller diameter wheel having four 90 degree-spaced label transfer units. Both wheels are rotated in steps with the first wheel rotated 120 degrees in each step and the second wheel rotated 90 degrees in each step. Each wheel simultaneously supplies labels to the in-mold labeling apparatus while permitting the two label magazines to be oriented at different angles in desired locations within the in-mold labeling system.

Other objects and features of the invention will become apparent as the description proceeds, especially when taken in conjunction with the accompanying drawings illustrating the invention, of which there are 7 sheets and two embodiments.

DESCRIPTION OF THE PREFERRED EMBODIMENT

In-mold labeling system 10 includes an in-mold labeling apparatus 12, a pair of rotary labeling transfer apparatus 14 and 16 located to either side of the lower end of apparatus 12 and a conventional rotary blow molding machine (not illustrated) including a plurality of mold sections 18 which are continuously rotated in a circle past the upper end of the in-mold labeling apparatus 12 when opened. Each mold section includes a pair of mold recesses 20 which define mold cavities for shaping bottles or containers manufactured by the rotary blow molding machine when the mold is closed. The in-mold labeling system 10 places labels accurately in the recesses 20 as the open mold sections 18 are rotated past the upper end of in-mold labeling apparatus 12. Apparatus 12 may be identical to the in-mold labeling apparatus disclosed in Johnston and Klinedinst U.S. Pat. No. 4,840,366, the disclosure of which is incorporated herein by reference.

Figure 1:
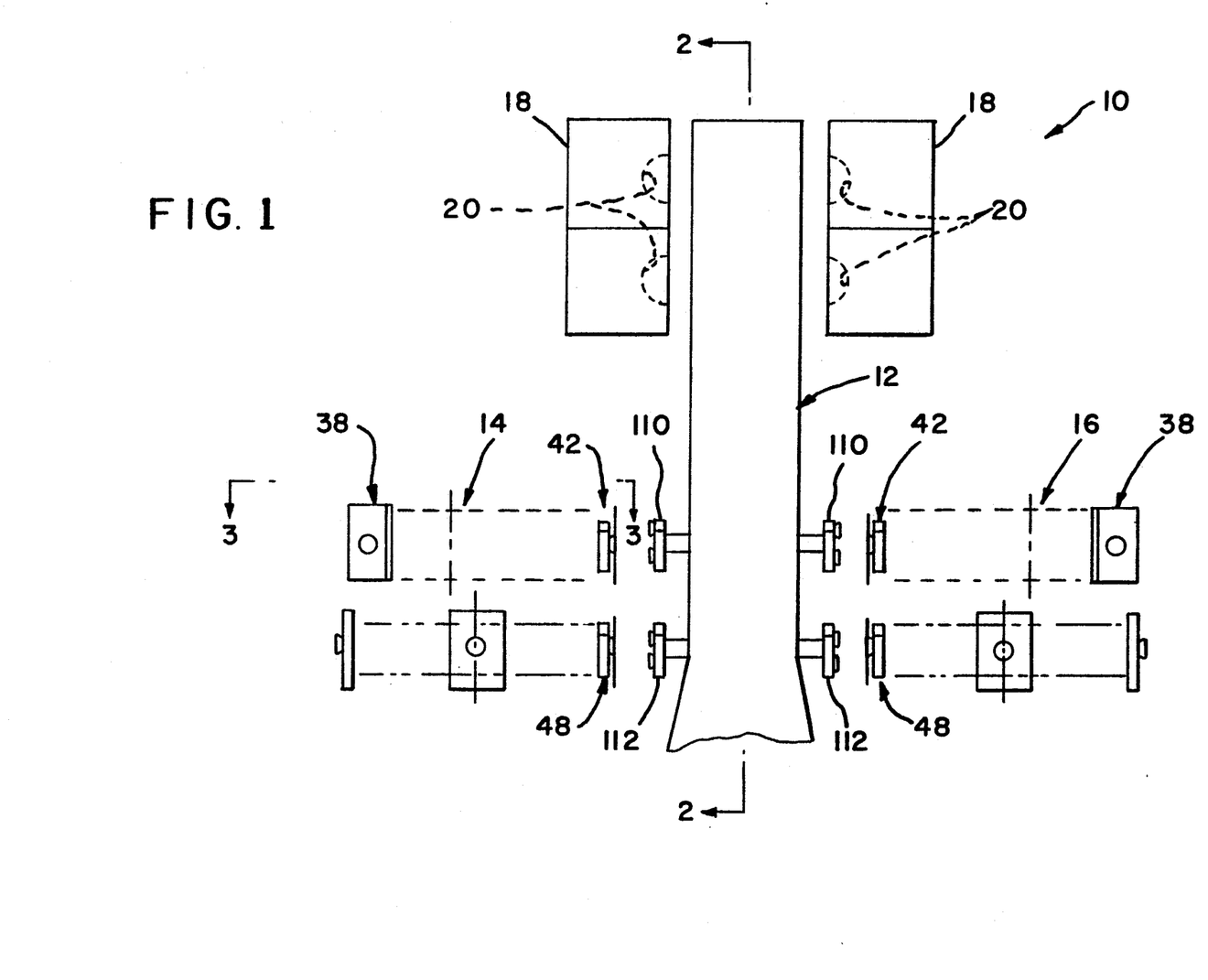
FIG. 1 is a generalized view showing an in-mold labeling system and two rotary label transfer units.

As shown in FIG. 1, in-mold labeling apparatus 12 includes two label transfer heads 110 and 112 on each side of the apparatus. The heads are moved between lower label pick up positions adjacent the two transfer apparatus 14 and 16 and elevated positions between the cavities 20 of open mold sections 18 as the sections are rotated around the rotary blow molding machine in the direction of arrow 24' of FIG. 2. The rotary label transfer apparatus 14 and 16 each remove a pair of labels from label baskets and present the labels for pick up by label transfer heads 110 and 112 and subsequent placement in the cavities 20 by apparatus 12. The operation of apparatus 12 is more fully described in U.S. Pat. No. 4,840,366.

The rotary label transfer apparatus 14 and 16 are identical with the exception that each is the mirror image of the other. The two apparatus work identically. Accordingly, only apparatus 14 and its operation will be described in detail with the understanding that the description also applies to apparatus 16.

Rotary label transfer apparatus 14 includes a pair of rotary transfer wheels 22 and 24, each of which is rotatably mounted on a vertical axis. Wheel 22 includes a rotary plate 26 which carries three circumferentially spaced label transfer units 30 shown in FIGS. 3 and 5. Smaller diameter wheel 24 includes a rotary plate 28 which carries four 90 degree spaced label transfer units 32 identical to units 30. See FIG. 3.

Figure 3:
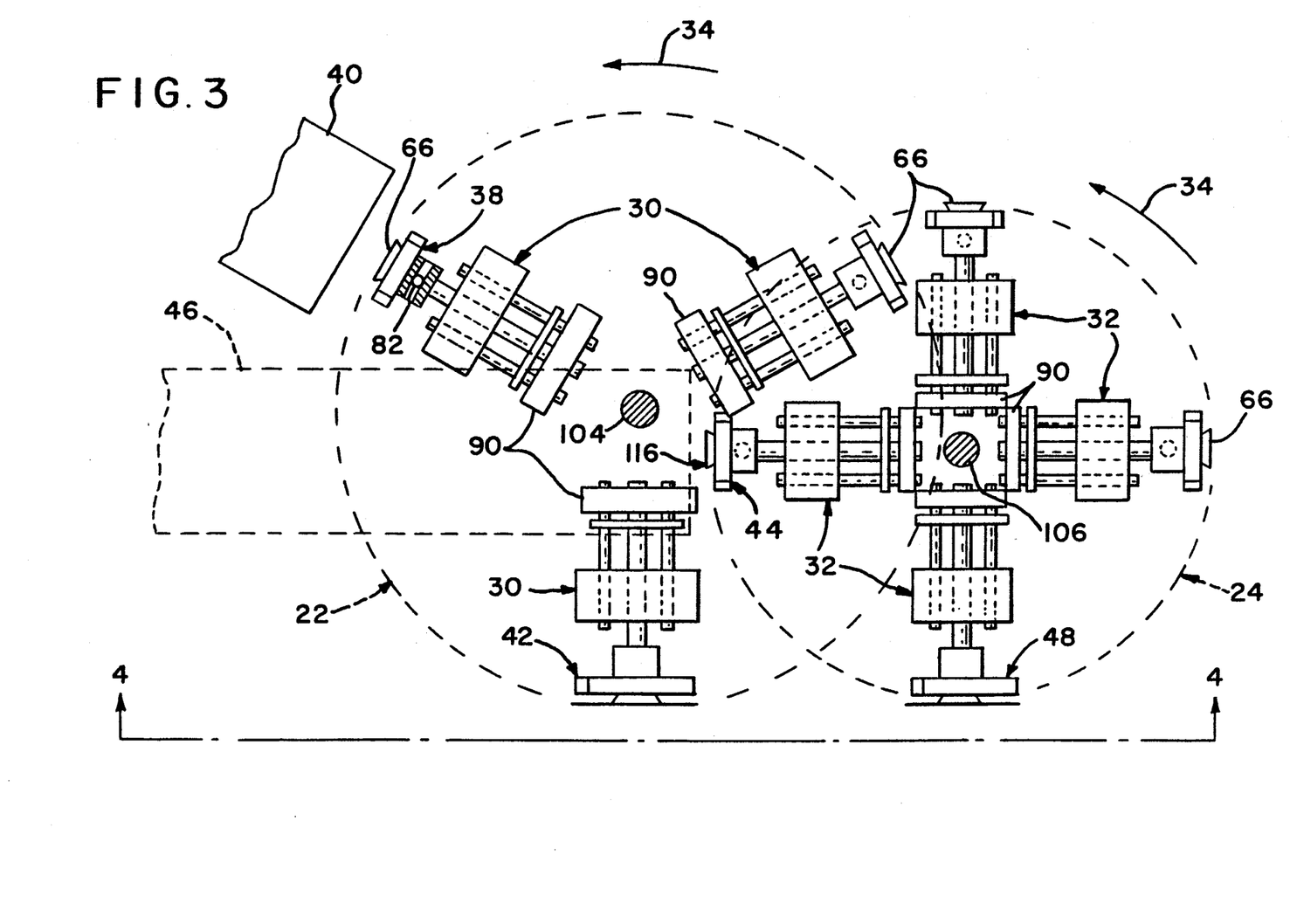
FIG. 3 is a top view of a rotary transfer apparatus taken along line 3—3 of FIG. 1.

During operation of apparatus 14 wheel 22 is repetitively indexed 120 degrees and then dwelled so that each of the transfer units 30 is brought to and dwelled at a label pick up position 38 opposite label magazine 40 and is then indexed to a label transfer position 42 facing the adjacent side of the in-mold labeling apparatus 12. Positions 38 and 42 are located 120 degrees apart as shown in FIG. 3.

Wheel 24 is repetitively indexed 90 degrees and then dwelled so that each of the transfer units 32 is brought to and dwelled at a label pick up position 44 opposite label magazine 46 and is then indexed to a label transfer position 48 facing the adjacent side of the in-mold labeling apparatus 12 and located below and to one side of label transfer position 42.

The wheels 26 and 28 are driven by a common drive synchronized with the drive of the rotary blow molding machine so that labels are picked up simultaneously from magazines 40 and 46 and moved simultaneously to the label transfer positions 42 and 48.

Figures 4, 6:
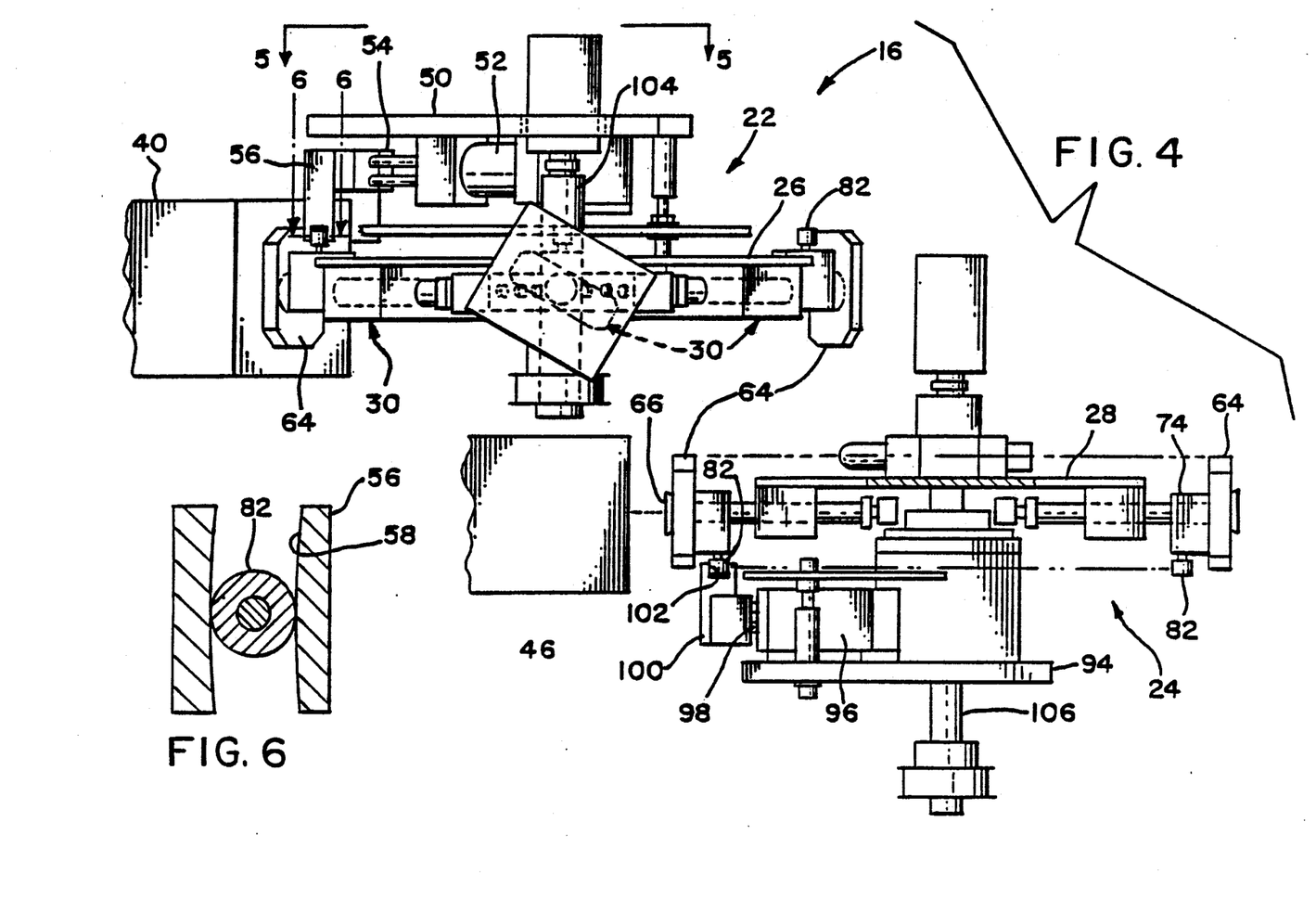
FIG. 4 is a side view taken along line 4—4 of FIG. 3.
FIG. 6 is a sectional view taken along line 6—6 of FIG. 4.

Fixed plate 50 located above rotary plate 26 supports fixed air cylinder 52 having piston rod 54 and extension and retraction block 56 mounted on the end of the rod. The block faces downwardly toward the path of movement of transfer units 30 and includes a slot 58 facing the units. Slot 58 is provided with curved walls as shown in FIG. 6 to permit a close sliding fit with followers carried on the units 30. The block 56 faces label magazine 40 so that extension and retraction of cylinder 52 moves the block directly toward and away from the magazine.

Figure 7:
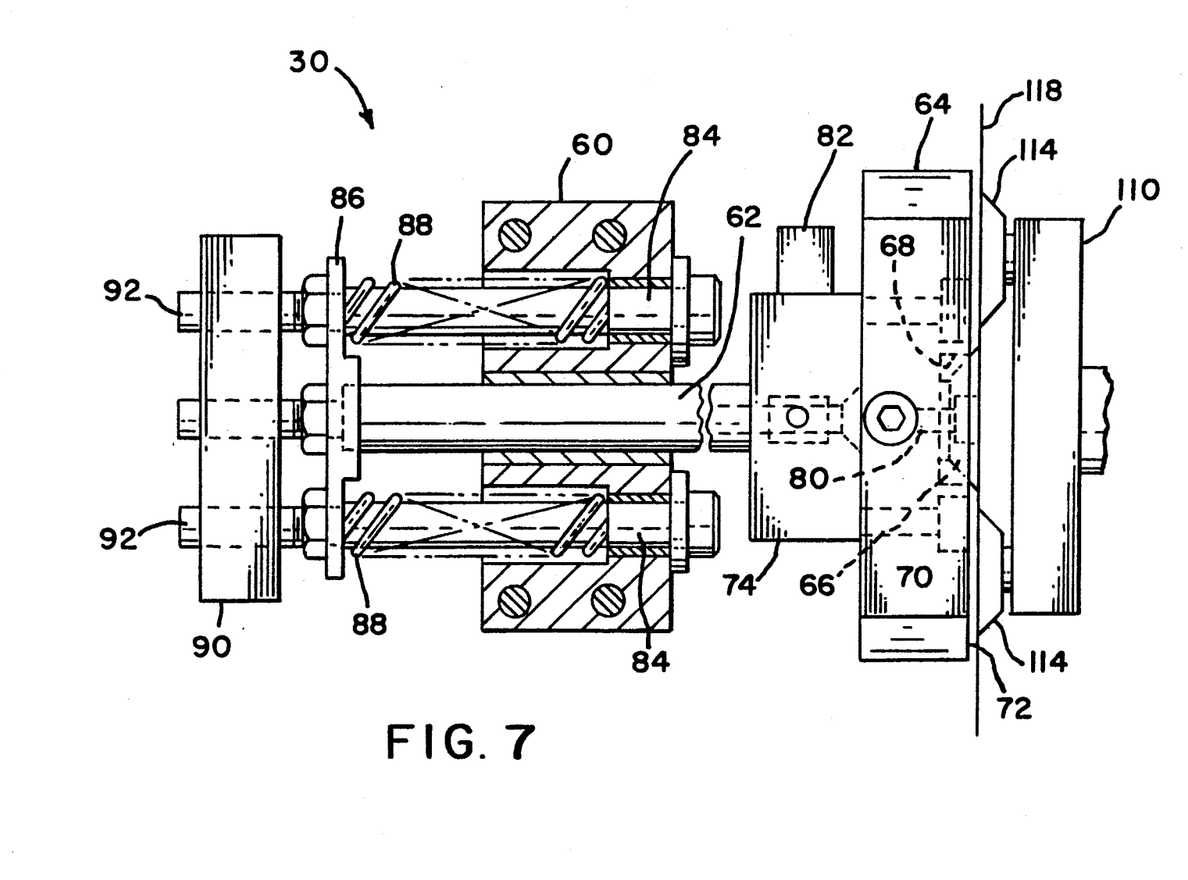
FIG. 7 is a sectional view showing a transfer head.
Figure 8:
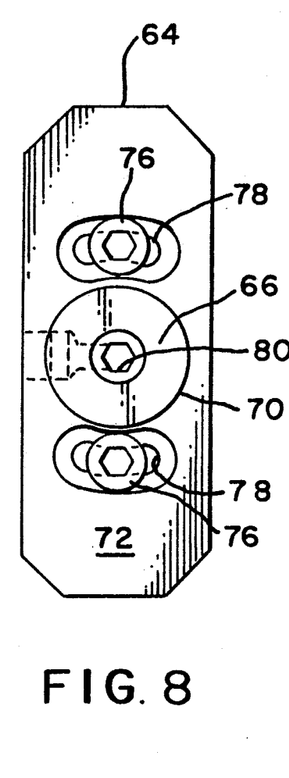
FIGS. 8 and 9 are front views of different types of label transfer heads.

FIG. 7 illustrates one of the label transfer units 30 carried by rotary plate 26. Unit 30 includes a mounting block 60 bolted to the lower surface of plate 26 with radially extending shaft 62 journalled in the block to permit rotation and radial extension and retraction of the shaft relative to the block. A label transfer head 64 is mounted on the outer end of the shaft and carries a suction cup 66 mounted in central recess 68 in the outer face of the head so that the circumferential lip 70 of the cup projects outwardly a short distance beyond the outer face 72 of the transfer head. Head 64 is mounted on a block 74 on the end of shaft 62 by a pair of bolts 76 extending through arcuate stepped slots 78 in the head. Loosening of bolts 76 permits limited angular adjustment of the elongate head 64 relative to shaft 62. This adjustment facilitates adjustment of the head relative to the label magazine for proper label pick up. A vacuum opening 80 opens into the interior of cup 66 and is connected to a vacuum manifold to enable head 64 to pick up labels from magazine 40 and secure the labels in place for movement to the label transfer heads in mold labeling apparatus 12. Rotary follower 82 mounted on block 74 extends upwardly for engagement with block 56 when unit 30 is adjacent magazine 40.

A pair of alignment pins 84 are journalled in bushings in block 60 and extend inwardly of the block. Plate 86 is secured to the inner ends of pins 84 with springs 88 confined between block 60 and plate 86. The radial inward end of shaft 62 extends through plate 86 and into rotary cylinder 90 supported on inner extensions 92 of pins 84. Actuation of cylinder 90 rotates the label transfer head 64 relative to block 60. The angle of rotation is adjustable. Springs 88 hold shaft 62 and head 64 in the radial inward or retracted position when units 30 are away from the label pick up position 38 adjacent magazine 40.

Units 32 are bolted to the bottom of plate 28 and are like units 30 on plate 26. In units 30 the cylindrical followers 82 extend upwardly from blocks 74 above plate 26. In units 32 the cylindrical followers 8 extend downwardly from blocks 74. In describing units 32 the reference numbers used to describe elements of units 30 will be used to describe corresponding elements of units 32.

Fixed plate 94 is located beneath plate 28 and supports air cylinder 96 having a piston rod 98 connected to extension and retraction block 100 like block 56. A slot 102 is formed in the upper face of block 100 like slot 58 in block 56. Elements 96, 98 and 100 may be identical to elements 52, 54 and 56. Cylinder 96 is located on plate 94 opposite magazine 46 so that extension and retraction of the cylinder moves block 100 toward and away from the magazine.

In-mold labeling apparatus 12 includes an upper label transfer head 110 and a lower label transfer head 112 on each side of the apparatus as shown in FIG. 1. The heads 110 and 112 are staggered so that when the in-mold labeling apparatus is retracted, heads 110 are located opposite label transfer positions 42 of units 30 and heads 112 are located opposite the label transfer positions 48 of units 32. Heads 110 and 112 are like and each include a pair of spaced vacuum cups 114 as shown in FIG. 7.

Rotary plate 26 is mounted on vertical support shaft 104 and rotary plate 28 is mounted on vertical support shaft 106. A drive mechanism (not illustrated) rotates shafts 104 and 106 synchronously with rotation of the mold sections in the blow molding machine and operation of the in-mold labeling apparatus 12 so that labels from magazines 40 and 46 are picked up by label transfer units, carried by label transfer units to the label transfer positions and picked u by the in mold labeling apparatus 12 for movement to the mold sections. The labels can be rotated through an adjustable angle during movement from the pick up positions 38 and 44 to the transfer positions 42 and 48.

Figure 2:
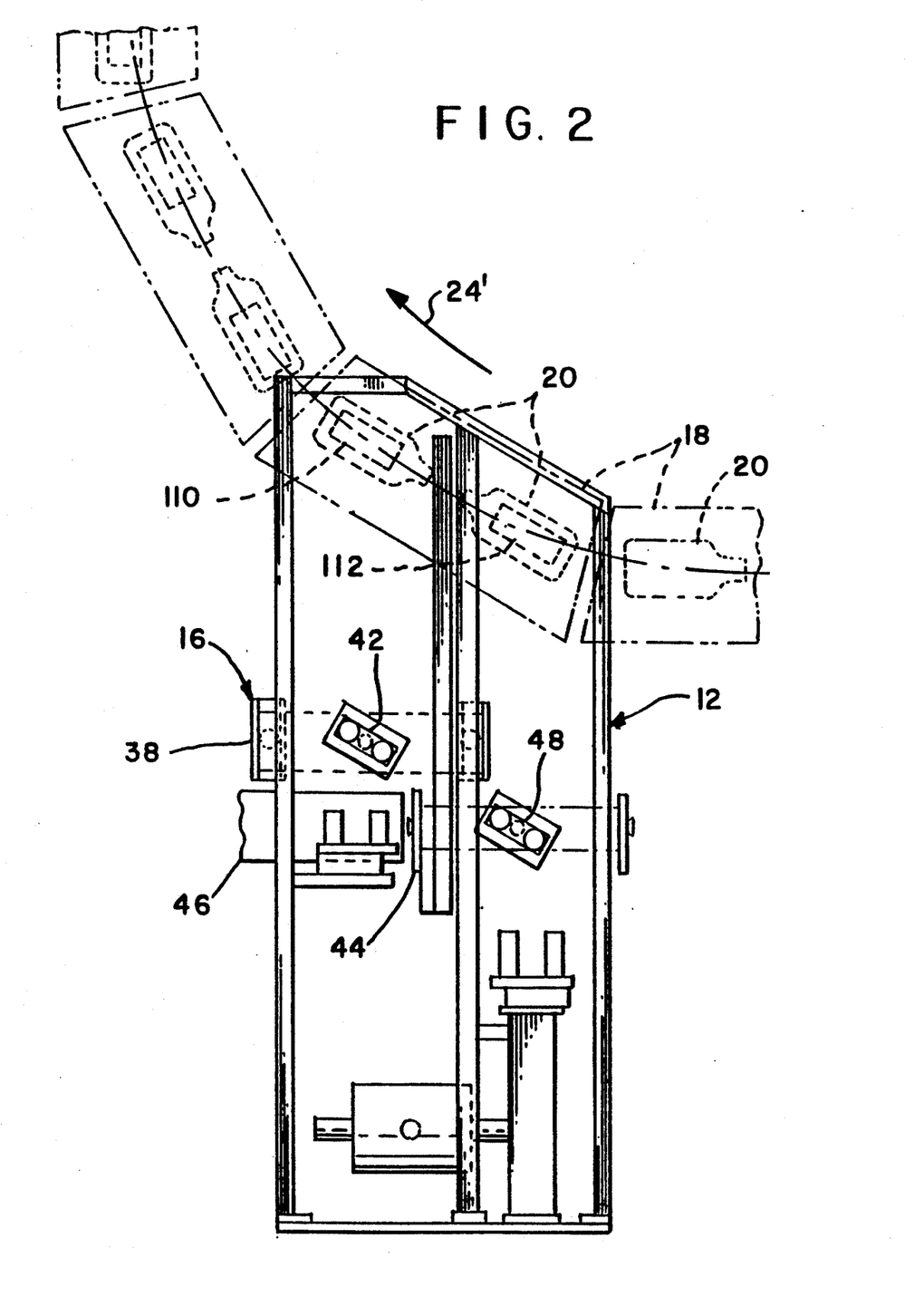
FIG. 2 is a generalized view of the system of FIG. 1 taken along line 2—2 of FIG. 1.

The operation of the in-mold labeling system 10 will now be described. The rotary blow molding machine continuously rotates pairs of mold sections 18 around a circular path during manufacture of blow mold labeled bottles. As the open mold halves move past the upper end of in-mold labeling apparatus 12 the label transfer heads 110 and 112 carry labels between the mold halves and are extended to place the labels in proper position within mold cavities 20. As illustrated in FIG. 2, the cavities are oriented at an acute angle to the vertical as they move past the in-mold labeling apparatus. Accordingly, label transfer heads 110 and 112 ar angled at a corresponding acute angle to the vertical in order to facilitate placement of labels into the cavities.

During the relatively long cycle of the IML apparatus 12 the two rotary label transfer apparatus 14 and 16 are actuated to pick up labels from the four label magazines 40 and 46 and present four labels at the label transfer positions 42 and 48 for pick up by heads 110 and 112. Rotation of the plates 26 and 28 to position units 30 and 32 in label transfer positions 42 and 48 also positions the adjacent upstream units 30 and 32 in the pick up positions 38 and 44 opposite the respective label magazines 40 and 46 as illustrated in FIG. 3. Movement of the units 30 and 32 to the positions opposite the magazines moves the cylindrical followers 82 on these units into the slots 58 of retracted blocks 56 and 100. The rotary drives for shafts 104 and 106 are dwelled following rotation of the plates to position the units as shown in FIG. 3.

Figure 5:
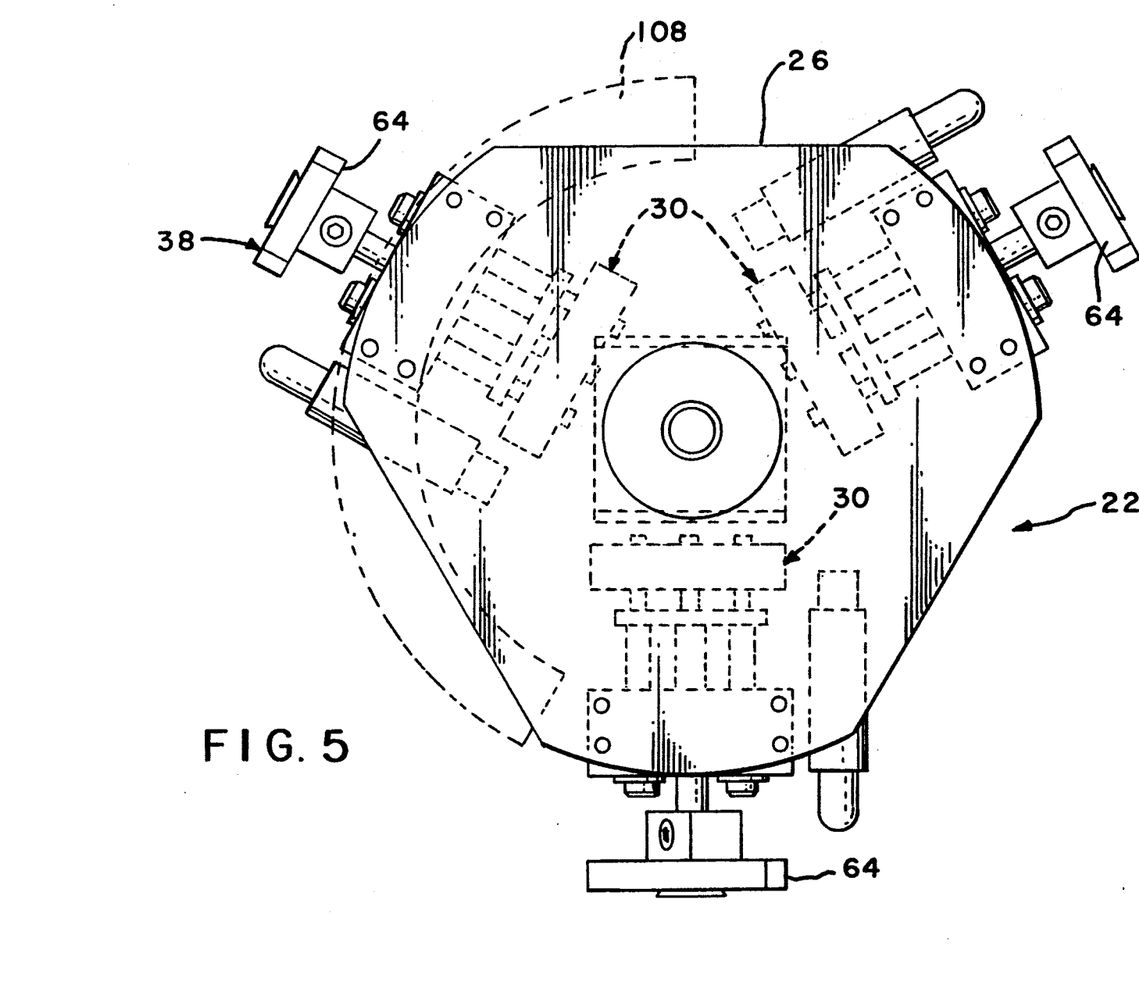
FIG. 5 is a top view of a transfer apparatus taken along line 5—5 of FIG. 4.

The vacuum ports 80 in the suction cups 66 are continuously connected to a low vacuum source through vacuum manifold (not illustrated). The suction cups are also individually connected to sources of high vacuum through valves (not illustrated) mounted on the respective plates 26 and 28 and having triggers engagable by fixed cam plates supported on plates 50 and 94. The cam plate 118 is shown in FIG. 5. As the respective plates 26 and 28 are rotated to move label pick up heads 64 to their respective label pick up positions 38 and 44, the triggers engage the plates to apply high vacuum to the suction cups 66. The high vacuum is applied to the suction cups prior to the cups being extended to engage labels in the respective magazines.

When units 30 and 32 are rotated to the label pick up positions 38 and 44, rollers 82 are moved into the slots 58 in blocks 56 and the units are dwelled in position of FIG. 3. Following dwelling, cylinders 52 and 96 are extended to move the label transfer heads 64 at the pick up positions radially outwardly and directly toward the respective magazines 40 and 46 to bring suction cups 66 into engagement with lead labels held in the magazines. The high vacuum supplied to cups 66 forms a vacuum connection joining the lead labels to the cups without picking up other labels. The cylinders are extended for a sufficient interval so that the pressure in cups 66 is reduced to the low pressure of the vacuum source thereby assuring a strong reliable vacuum connection between the lead labels and the cups. After the strong vacuum connection has been formed cylinders 52 and 96 are retracted to move the transfer heads 38 radially inwardly and remove the lead labels from the magazines. If desired, the drive rotating shafts 104 and 106 may be actuated to rotate the plates, units and labels away from the label pick up positions 30 and 44 as soon as the lead labels clear the magazines and before cylinders 52 and 96 are fully retracted. Extension of the cylinders 52 and 56 compresses springs 88 as the heads 64 are moved radially outwardly. Upon retraction of the cylinders the springs hold the heads 64 in the retracted position as indicated in FIG. 3.

Actuation of the rotary drives indexes both label transfer heads from the pick up positions 38 and 44 to the label transfer positions 42 and 48. During this time the rotary cylinders 90 may be actuated to rotate the elongate label transfer heads 64 and the labels carried by the heads on cups 66 through an appropriate angle so that the labels are properly positioned for pick up by heads 110 and 112 for subsequent placement in the angled mold recesses.

Continued rotation of the shafts 104 and 106 moves the transfer heads 38 carrying labels to the label transfer positions 42 and 48 for pick up by the IML transfer heads 110 and 112. FIG. 7 shows transfer of a label 118 from transfer head 64 of a transfer unit 30 to an upper transfer head 110 of in-mold labeling apparatus 12. Head 64 has been rotated to an acute angle and is positioned generally parallel to a head 110. Head 110 carries spaced suction cups 114 located to either side of the central suction cup 66 of head 64. Extension of the transfer head 110 by IML 12 brings the cups 114 into engagement with the side of the label 118 opposite from cup 66. As illustrated, the lip 70 of cup 66 projects only a small distance above the face 72 of head 64 so that the cups 114 engage the label and, with slight further outward movement of head 110, press the label into engagement with face 72 which supports the label and assures that the high vacuum source connected to the cups 114 forms high vacuum connections with the label.

During movement of the heads 64 to the label transfer positions 42 and 48, the vacuum switches in the high vacuum manifolds fall off the cam plates and reduce the vacuum in cups 66 holding the labels on the heads 64. The reduced vacuum is sufficient to maintain the labels in place during movement to the label transfer positions. However, the low pressure vacuum connections to the labels and the cups 66 is weaker than the two high pressure vacuum connections between the label on the cups 114 of IML transfer head 110. Retraction of the head 110 by IML 12 strips the labels 118 from cups 66 so that the labels are free for movement with head 110. Following retraction of the four IML label transfer heads 110 and 112 the IML 12 moves the heads up between the mold halves and places the labels in the mold cavities 20 as described in U.S. Pat. No. 4,840,366.

At the same time the labels 118 are stripped from the transfer heads 64 at positions 42 and 48 the cylinders 52 and 96 are extended to move the transfer heads at positions 38 and 44 radially outwardly to engage lead labels in the magazines and, upon retraction of the cylinders, to pick the lead labels from the magazines. As soon as the labels 118 are stripped from the heads at the transfer positions the rotary drive for shafts 104 and 106 is actuated to rotate the units 30 and 32 from the pick up positions to the transfer positions. Movement of the heads 64 and vacuum-supported labels to the transfer positions 42 and 48 moves the next upstream heads 62 to the pick up positions for pick up of labels during the time the wheels are dwelled and labels are transferred to the IML heads 110 and 112. Cylinders 90 are actuated during rotation of the wheels, as previously described, to move the transfer heads in the proper angular orientation so that the labels are in position for proper placement in the angled mold cavities. During movement of the units 30 and 32 back to the pick up positions the cylinders 90 are returned to the initial positions so that the label transfer heads are rotated back to the initial positions for subsequent pick up of labels when returned to the pick u positions. Return of the heads to the initial positions returns the cylindrical followers 82 to proper position for movement into slots 58 as the units are rotated to the pick up positions.

Limited space is available in in-mold labeling system 10 for mounting of the label magazines. Large diameter wheel 22 is provided with three label transfer units 30 and an indexing angle of 120 degrees in order to position magazine 40 within space available in apparatus 10. The 90 degree indexing steps of small diameter wheel 24 permits locating magazine 46 in available space in the apparatus. Ready access to the magazines 40 and 46 facilitates initial adjustment and maintenance of the magazines while also permitting relatively easy label loading. This is an important feature when, during continuous operation of apparatus 10, it is necessary to recharge the magazines with additional labels hourly or more often.

Figure 9:
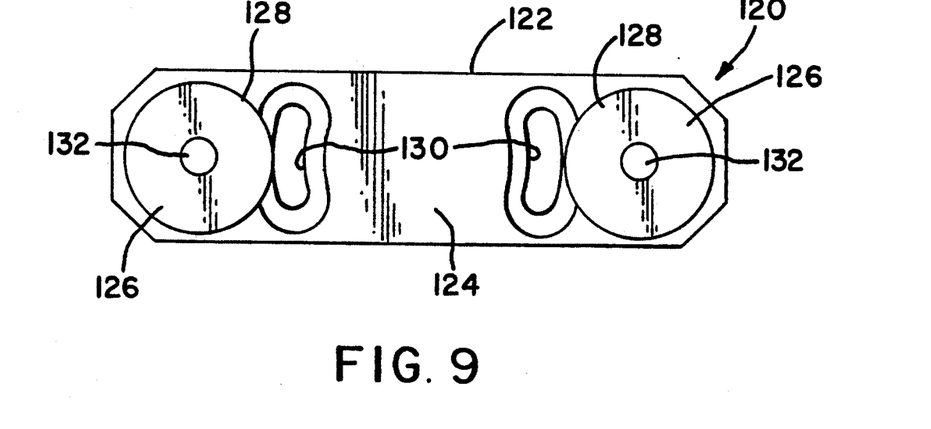
Figure 10:
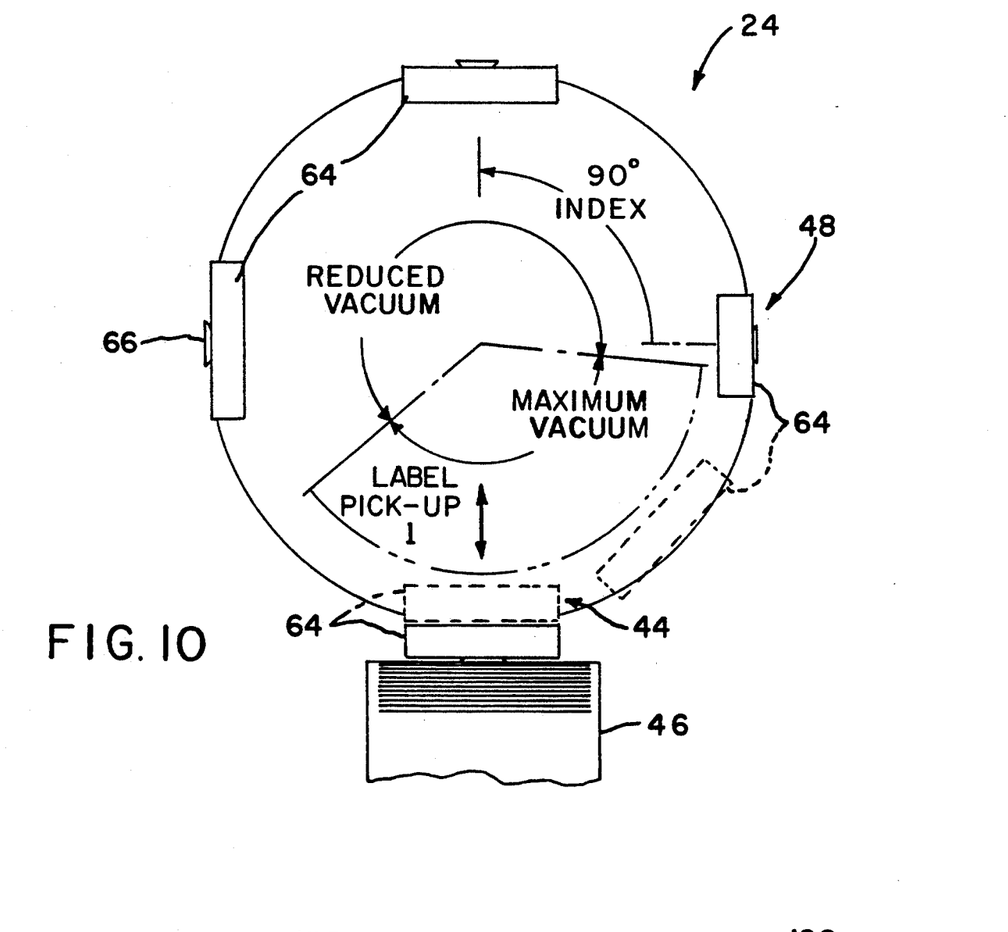
FIG. 10 is a representational view illustrating the vacuum applied to the transfer heads.

FIG. 9 illustrates a second embodiment label transfer head 120 for units 30 and 32. Head 120 is similar to first embodiment head 64 and includes an elongate body 122 having a face 124, a pair of suction cups 126 mounted in recesses in the ends of the body like suction cup 66 of head 64. Lips 128 of suction cups 126 extend outwardly a very slight distance above face 124. Arcuate slots 130 are formed in block 120 to permit mounting of the head on block 74 and limited angular rotation of the head on the block. Vacuum ports 132 open the interior of cups 126 similar to port 80.

Cups 126 on label transfer head 120 are spaced apart the same distance as the two vacuum cups 114 carried by IML label transfer heads 110 and 112. During transfer of labels from heads 120 to heads 112 and 112 the vacuum cups 114 engage the label directly over the vacuum cups 126 and, upon withdrawal of heads 110 and 112, strip the labels from cups 126.

The use of heads 120 permits forming a redundant, two suction cup connection with the lead labels in the magazines to facilitate picking of the labels from the magazines. Also, use of these transfer heads permits pick up of the labels by the IML heads 110 and 112 with minimized wrinkling or stressing of the labels during the transfer process.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. The method of labeling a mold cavity in a blow molding machine comprising the steps of:
    a. extending a stationary first vacuum cup directly toward a label in a label magazine to engage the label while drawing a high vacuum through the cup, forming a high vacuum connection between the first cup and the label and then withdrawing the cup away from the magazine to remove the label from the magazine;
    b. reducing the level of vacuum holding the label to the cup to low vacuum after removal of the label from the magazine and before transfer of the label to a second cup;
    c. moving the first cup and held label to a label transfer position located away from the magazine;
    d. moving by second vacuum cup into engagement with the label at the label transfer position and forming a high vacuum connection between the label and the second cup and then separating such second cup from the first cup which is at low vacuum to strip the label from the first cup and transfer the label to the second cup; and
    e. moving the second cup and label to a mold part and placing the label in the cavity in the mold part.

2. The method of claim 1 including the step of moving the second cup to engage the side of the label away from the first cup.

3. The method of claim 2 including the step of moving the second cup to engage the label directly over the first cup.

4. The method of claim 1 including the step of moving two spaced vacuum cups to engage and strip the label from the first vacuum cup.

5. The method of claim 1 including the step of rotating the first vacuum cup and label about an axis perpendicular to the label after removal of the label from the label magazine and before transfer of the label to the second cup.

6. The method of claim 1 including the step of rotating the first cup and held label through a fixed angle around a circumferential path relative to an axis located away from the label magazine and the transfer position.

* * * * *